United States Patent [19]

Uno

[11] 4,194,157
[45] Mar. 18, 1980

[54] PORTABLE RADIO RECEIVER WITH DETACHABLE SPEAKER UNIT

[75] Inventor: Takeshi Uno, Kawasaki, Japan
[73] Assignee: Sony Corporation, Tokyo, Japan
[21] Appl. No.: 833,708
[22] Filed: Sep. 15, 1977

[30] Foreign Application Priority Data

Sep. 14, 1976 [JP] Japan ............................ 51-124750[U]

[51] Int. Cl.² .............................................. H04B 1/08
[52] U.S. Cl. .................................... 455/348; 455/349; 455/351; 312/7 R
[58] Field of Search ............... 325/310, 311, 352, 353, 325/355, 356, 361; 179/100.11, 100.12 R, 100.12 A; 317/391, 422, 380; 339/119 R, 58, 91 F, 91 R, 79 M, 69 M; 312/7 R

[56] References Cited

U.S. PATENT DOCUMENTS

| | | | |
|---|---|---|---|
| 2,771,560 | 11/1956 | Creiman | 325/355 |
| 3,748,583 | 7/1973 | Anderson et al. | 325/353 |
| 3,973,179 | 8/1976 | Weber et al. | 339/58 |
| 4,041,250 | 8/1977 | Sato | 179/100.11 |
| 4,074,082 | 2/1978 | Sato et al. | 325/355 |

FOREIGN PATENT DOCUMENTS 1232719  4/1960  France ........................................ 325/36

Primary Examiner—Robert L. Griffin
Assistant Examiner—Jin F. Ng
Attorney, Agent, or Firm—Lewis H. Eslinger; Alvin Sinderbrand

[57] ABSTRACT

An audio apparatus in the form of a radio receiver is composed of a first part including electrical components constituting a tuner housed within a first cabinet for providing audio signals, a second part including at least a loud speaker housed within a second cabinet for converting the audio signals to sound, and cooperative mechanical and electrical coupling members at mating surfaces of the first and second cabinets for detachably assembling together the first and second parts of the apparatus with such mating surfaces of the respective cabinets in abutting relationship. When the first and second parts of the audio apparatus are detached from each other, the first part thereof may be used alone as a pocket radio with the audio signals produced thereby being audibly reproduced by means of an earphone engaged with a respective jack of such first part. Further, when the first part is detached from the second part, a casing or cover can be engaged with the mechanical coupling member of the first part for protecting the detached first part.

13 Claims, 12 Drawing Figures

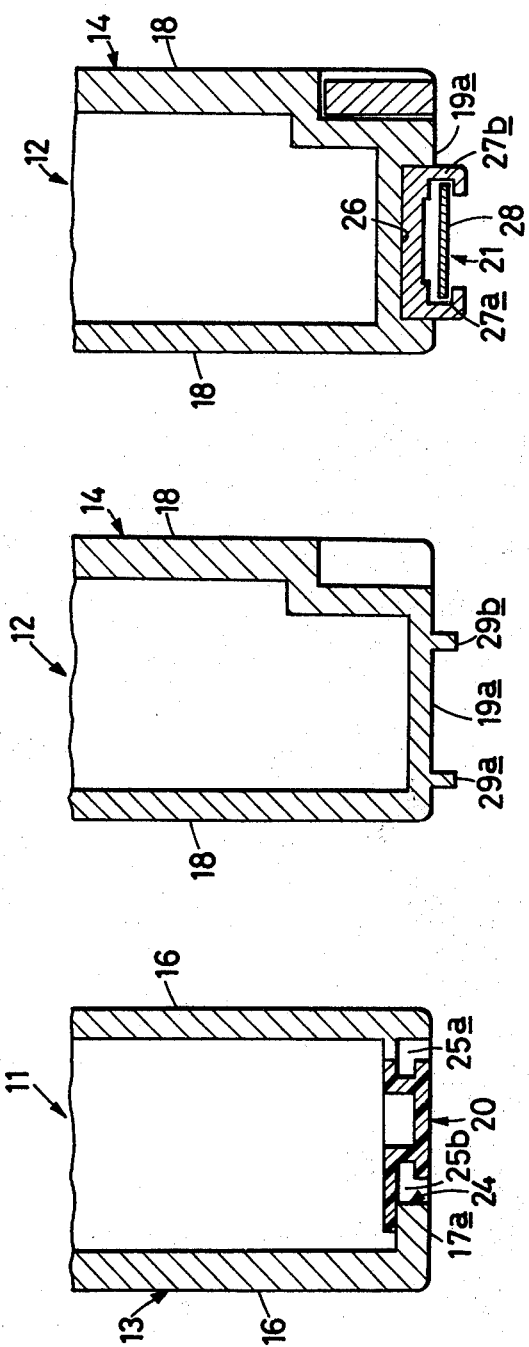

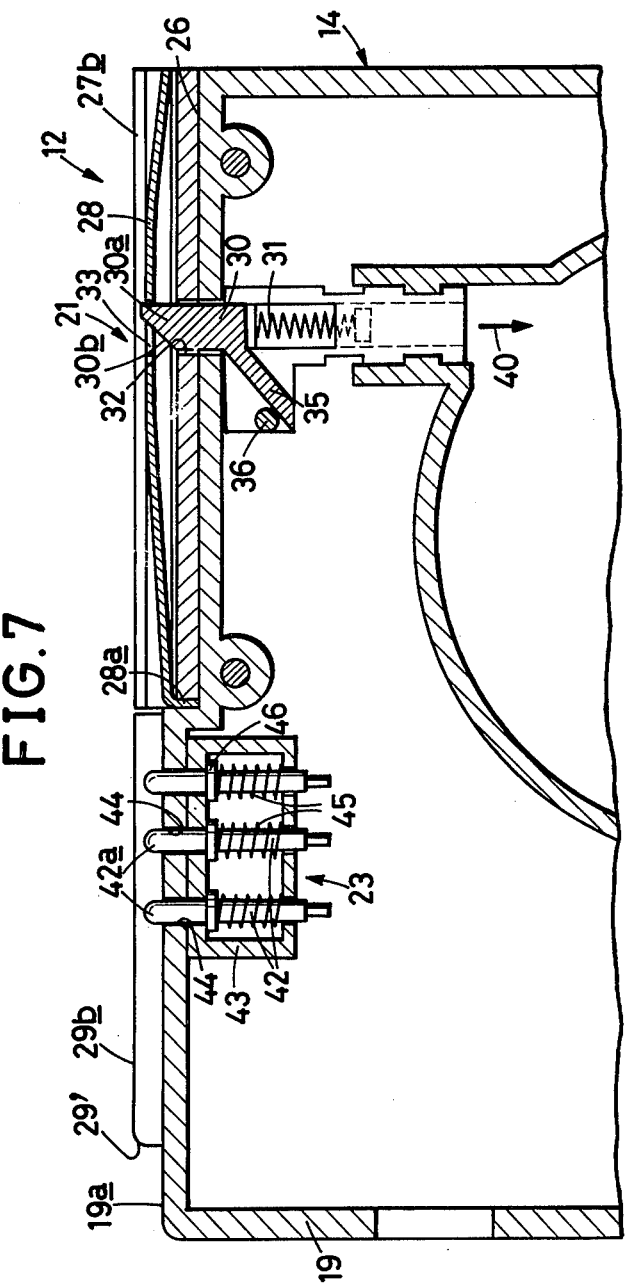

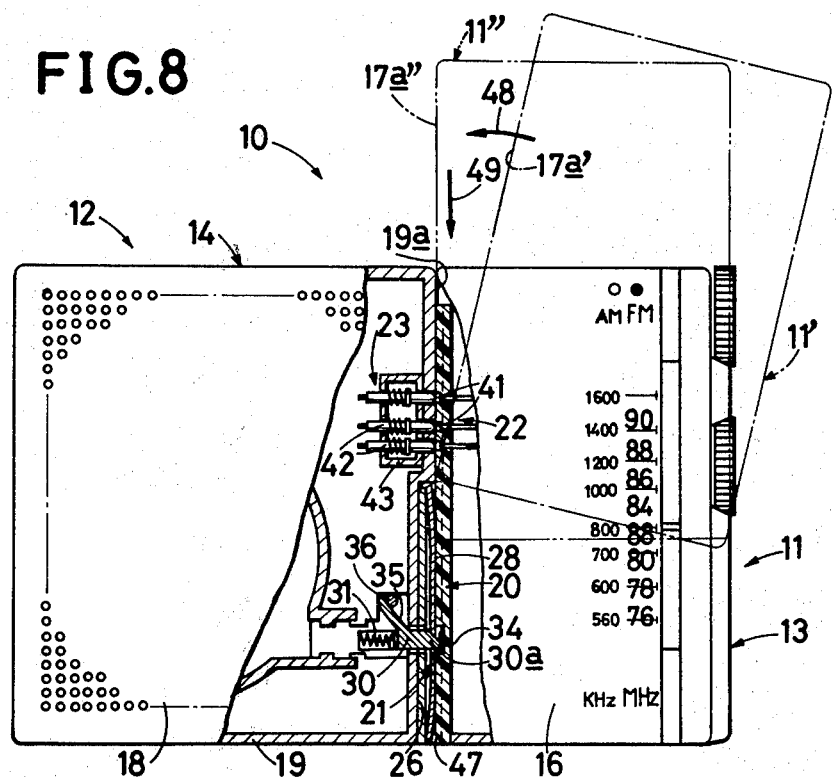

PORTABLE RADIO RECEIVER WITH DETACHABLE SPEAKER UNIT

BACKGROUND OF THE INVENTION

1. Field of the Invention

This invention relates generally to audio apparatus, and more particularly is directed to an improved audio apparatus comprising a first part for providing audio signals and which is detachably assembled with a second part including a loud speaker or the like for converting the audio signals into audible sounds.

2. Description of the Prior Art

It is well known to provide electrical apparatus composed of several independent parts or components which are detachably assembled together. For example, in U.S. Pat. No. 3,916,122, an audio apparatus is disclosed to comprise a radio portion and a tape recorder portion which are adapted to be mechanically and electrically coupled to each other for joint use or uncoupled from each other for individual use. However, in such existing audio apparatus, the radio and tape recorder portions are coupled with each other, both mechanically and electrically, by means of a plurality of pins extending from one of the portions and being engaged in recesses of the other portion. The foregoing coupling arrangement is undesirably complicated and, furthermore, does not provide a coupling of sufficient strength.

In Japanese Utility Model Publication No. 1465/1966, a radio receiver is disclosed in which a radio portion and an ornamental portion are detachably mounted on a base portion. In order to effect such detachable mounting, the base portion is formed with a dovetail groove for receiving rail portions formed at the bottoms of the radio portion and the ornamental portion, respectively. Although the foregoing structural arrangement affords sufficient mechanical strength to the detachable mounting of the radio portion and ornamental portion on the base portion of the radio receiver, considerable difficulty is encountered in engaging the rail portions in the dovetail groove when mounting or assembling the radio portion and ornamental portion on the base portion.

OBJECTS AND SUMMARY OF THE INVENTION

Accordingly, it is an object of this invention to provide an audio apparatus comprised of a plurality of parts or components which are detachably assembled together in a manner to avoid the above described defects of the prior art.

More specifically, it is an object of this invention to provide an audio apparatus comprised of a plurality of parts which may be easily and securely assembled together for joint use, or disassembled for individual use of at least one of the parts.

More particularly, an object of the invention is to provide an audio apparatus which comprises a first part including electrical components for providing audio signals, for example, as in a radio tuner, a second part including a loud speaker for converting the audio signals to sound, and an assembling arrangement or structure by which the first and second parts can be easily and securely assembled or coupled with each other, both mechanically and electrically.

A further object is to provide an audio apparatus, as aforesaid, in which, when the first and second parts or components thereof are detached or separated from each other, the part including the electrical components for providing audio signals can be substantially covered by a removable case or the like for protecting such part.

In accordance with an aspect of this invention, in an audio apparatus having a first part for providing audio signals and a second part for converting the audio signals into sound, the first and second parts are detachably assembled together with mating surfaces of the respective cabinets in abutting relationship by means of complementary mechanical coupling members at the mating surfaces of the cabinets, respectively, and electrical coupling means separate from the mechanical coupling members at the mating surfaces.

It is a particular feature of this invention that one of the above mentioned mechanical coupling members defines at least one undercut groove extending a substantial distance along the respective mating surface and having an opening at one end of the groove, while the other mechanical coupling member defines, for each undercut groove, a respective flange extending a substantial distance along the other mating surface and having a cross-sectional shape corresponding to that of the respective undercut groove so as to be slidably insertable in the latter through the end opening of the groove. Further, the electrical coupling means includes cooperative terminal means at the mating surfaces, respectively, and being engaged with each other for establishing electrical connections between the first and second parts when the latter are assembled together with the mating surfaces in the abutting relationship.

The above, and other objects, features and advantages of this invention, will be apparent from the following detailed description of an illustrative embodiment thereof which is to be read in connection with the accompanying drawings.

BRIEF DESCRIPTION OF THE DRAWINGS

FIG. 4 is a detail sectional view taken along the line IV—IV on FIG. 2;

FIG. 5 is a detail sectional view taken along the line V—V on FIG. 3;

FIG. 6 is a detail sectional view taken along the line VI—VI on FIG. 3;

FIG. 7 is a detail sectional view taken along the line VII—VII on FIG. 3;

FIG. 8 is a front elevational view of the radio receiver of FIG. 1 with the tuner and speaker parts thereof being shown partly broken away for disclosing how such parts are assembled together;

DESCRIPTION OF PREFERRED EMBODIMENTS

Figure 1:
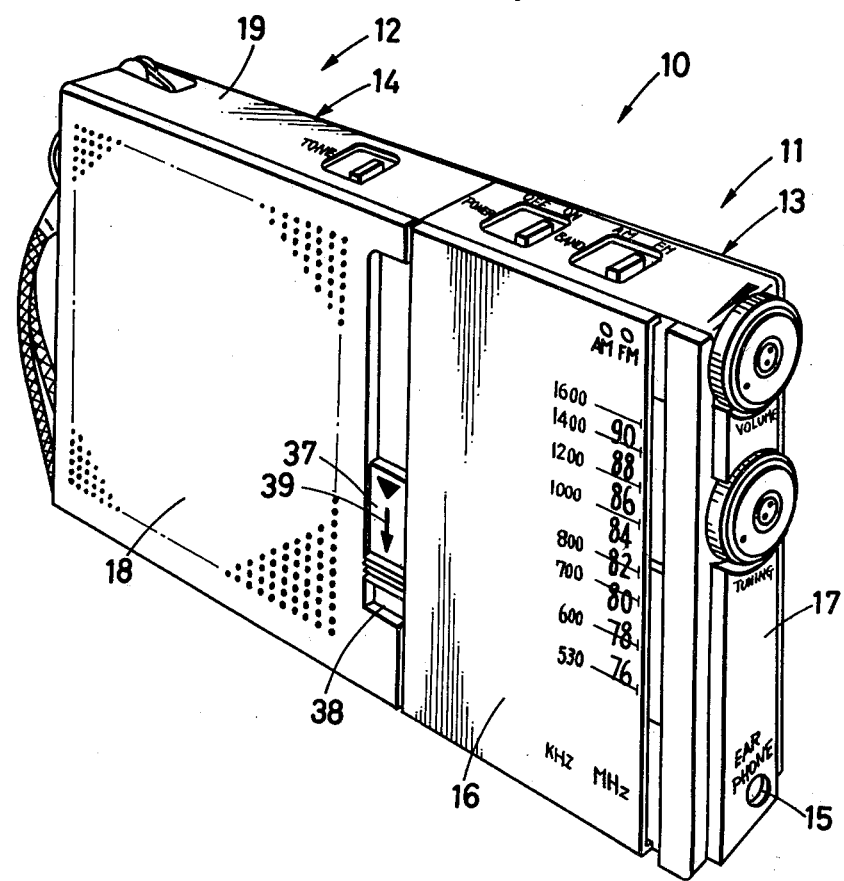
FIG. 1 is a perspective view of an audio apparatus according to an embodiment of this invention which comprises a tuner part and a speaker part shown assembled to each other to form a radio receiver.
Figure 2:
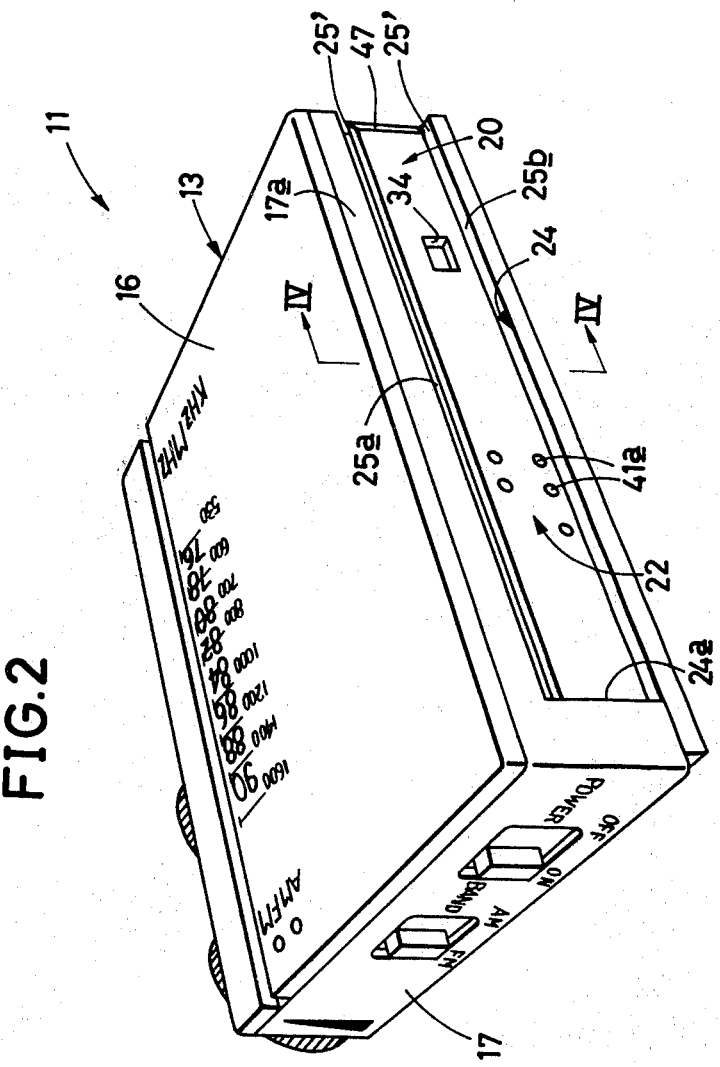
FIG. 2 is a perspective view of the tuner part of the radio receiver of FIG. 1, and which is shown separated from the speaker part.
Figure 3:
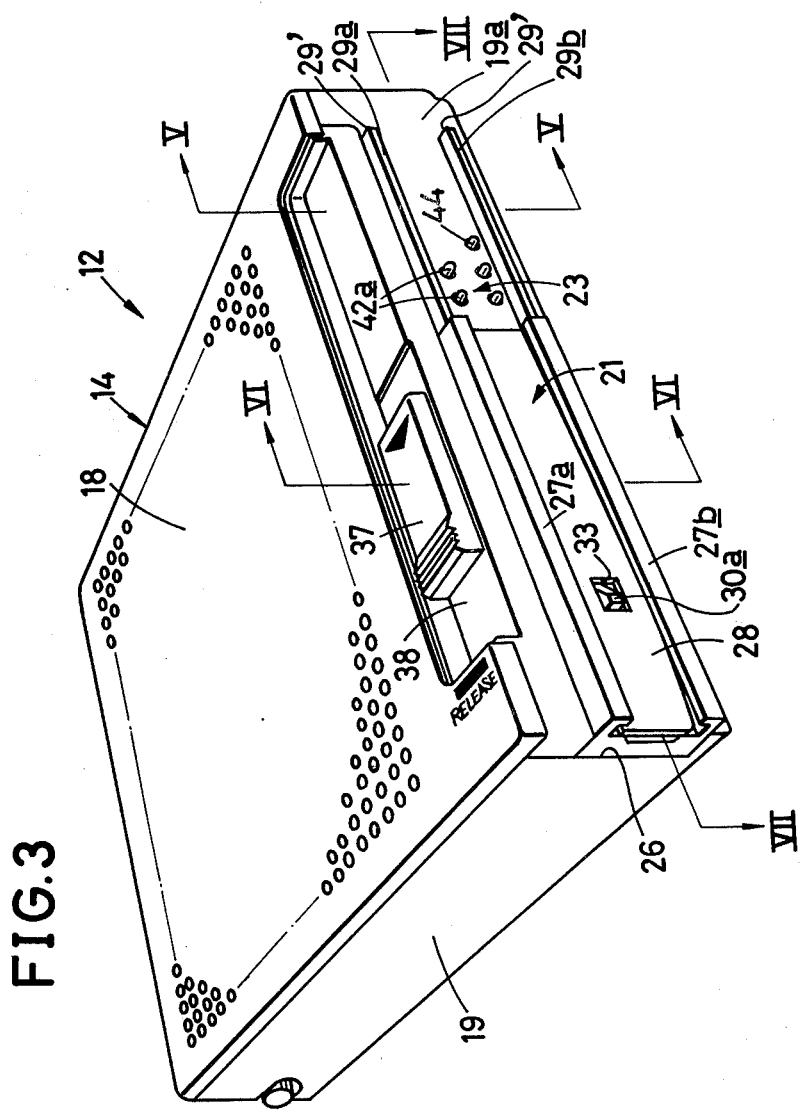
FIG. 3 is a perspective view of the speaker part of the radio receiver of FIG. 1, and which is shown separated from the tuner part.

Referring to the drawings in detail, and initially to FIG. 1 thereof, it will be noted that the present invention is there shown applied to an audio apparatus 10 in the form of a small, easily portable radio receiver comprised of first and second parts 11 and 12 which may be assembled together, as shown on FIG. 1, or detached from each other and separated as shown on FIGS. 2 and 3, respectively. The first part 11 of radio receiver 10 constitutes a tuner part having a cabinet 13 which contains suitable, conventional circuit components (not shown) for receiving a radio frequency signal and providing an electrical audio frequency signal, while the second part 12 of radio receiver 10 constitutes a speaker part having a cabinet 14 containing at least a loud speaker (not shown) by which the audio frequency signal from tuner part 11 is reproduced as audible sounds when parts 11 and 12 are assembled together as shown on FIG. 1. On the other hand, when tuner part 11 is separated from speaker part 12, as shown on FIG. 2, the audio signal from tuner part 11 may be reproduced by means of an earphone (not shown) plugged into a jack or receptacle 15 (FIG. 1) provided at an exposed surface of cabinet 13.

As shown, the tuner and speaker cabinets 13 and 14 are desirably in the form of substantially flat, rectangular parallelepipeds. Thus, tuner cabinet 13 has two spaced apart rectangular panels or walls defining opposed, substantially flat major surfaces 16 and being joined by a peripheral wall 17 extending around the four sides of cabinet 13. Similarly, speaker cabinet 14 has two spaced apart rectangular panels defining opposed substantially flat surfaces 18, at least one of which may be perforated, as shown, for emitting sound therethrough, and being joined by a peripheral wall 19 extending around the four sides of cabinet 14. As shown in FIG. 1, parts 11 and 12 of radio receiver 10 are intended to be assembled together in side-by-side relation, that is, with respective side portions of peripheral walls 17 and 19 which form mating surfaces 17a and 19a, respectively (FIGS. 2 and 3), being disposed in abutting relationship.

Generally, in accordance with this invention, the assembling means for detachably assembling together the tuner and speaker parts 11 and 12 with the mating surfaces 17a and 19a in the desired abutting relationship include complementary mechanical coupling members 20 and 21 at mating surfaces 17a and 19a, respectively, of cabinets 13 and 14, and electrical coupling means apart from the mechanical coupling members 20 and 21. Such electrical coupling means is shown to include cooperative terminal means 22 and 23 at the mating surfaces 17a and 19a, respectively, and being engaged with each other for establishing electrical connections between the parts 11 and 12 when the latter are assembled together with the mating surfaces 17a and 19a thereof in abutting relationship.

As shown particularly on FIGS. 2 and 4, the mechanical coupling member 20 at surface 17a is in the form of an elongated synthetic resin or plastic insert cemented or otherwise suitably secured in a cutout 24 which extends along surface 17a and opens at one end of the latter. The coupling member or insert 20 cooperates with the opposite side edges of cutout 24 to define a pair of parallel grooves 25a and 25b which are undercut towards each other so as to be of substantially L-shaped cross section (FIG. 4). The grooves 25a and 25b extend substantially along the entire length of surface 17a and are closed at one end, as by the end edge 24a of cutout 24, while the other ends of grooves 25a and 25b are open, at at 25' (FIG. 2).

Referring now to FIGS. 3, 6 and 7, it will be seen that the other mechanical coupling member 21 is in the form of an elongated metal rail, for example of aluminum, extending along approximately one-half of the length of surface 19a and being suitably secured in a recess 26 of corresponding length formed in surface 19a. The metal rail constituting coupling member 21 defines a pair of parallel, spaced apart flanges 27a and 27b of L-shaped cross section (FIG. 6), that is, having cross-sectional shape corresponding to the respective undercut grooves 25a and 25b of coupling member 20. Thus, the flanges 27a and 27b of mechanical coupling member 21 are slidably insertable in the corresponding grooves 25a and 25b of coupling member 20 through open ends 25' of the grooves upon relative displacements of cabinets 13 and 14 in directions parallel to grooves 25a and 25b and flanges 27a and 27b. An arcuate leaf spring 28 is suitably secured at one end, as at 28a (FIG. 7), to coupling member 21 and extends along the latter between flanges 27a and 27b so as to be retained by the edge portions of such flanges which are directed toward each other. It will be apparent that, when flanges 27a and 27b are engaged in grooves 25a and 25b, arcuate leaf spring 28 engages between coupling members 20 and 21 for taking up the play therebetween and thereby providing a stable or rattle-free coupling between cabinets 13 and 14.

In order to fascilitate the assembling together of tuner part 11 and speaker part 12, guide means are provided for guiding flanges 27a and 27b into the respective grooves 25a and 25b. Such guide means are shown to be constituted by ribs 29a and 29b extending longitudinally on surface 19a in alignment with the portions of the respective flanges 27a and 27b which are normal to the surface 19a so as to be engagable in the respective grooves 25a and 25b for leading the aligned flanges into the latter. The guiding ribs 29a and 29b are longitudinally dimensioned so that the ends 29' thereof (FIG. 3) remote from coupling member 21 will engage the closed ends of grooves 25a and 25b defined by edge 24a of cutout 24 in surface 17a and thereby prevent further relative displacement of cabinets 13 and 14 when surfaces 17a and 19a of the cabinets are in properly mated abutting relationship.

The apparatus 10 further has locking means by which cabinets 13 and 14 may be releasably secured in the assembled together condition shown on FIG. 1. Such locking means is shown to include a locking member 30 (FIG. 7) mounted in speaker part 12 for movement normal to surface 19a of the respective cabinet 14, and being urged, as by a spring 31, to a projecting position in which an end portion 30a of locking member 30 extends beyond surface 19a through suitably located holes 32 and 33 in coupling member 21 and in spring 28, respectively. The end portion 30a of locking member 30 is further shown to have a beveled surface 30b at the side of the latter facing in the direction of movement of cabinet 14 relative to cabinet 13 for engaging flanges 27a and 27b in grooves 25a and 25b. The locking means of apparatus 10 further includes a keeper 34 in surface 17a, for example, as is constituted by the illustrated aperture or recess (FIGS. 2 and 8) in coupling member 22, for receiving end portion 30a of locking member 30 in the projecting position of the latter when cabinets 13 and 14 are assembled together. In order to effect release of the locking means, the locking member 30 is shown to have an extension 35 (FIG. 7) which is inclined relative to the direction of movement of the locking member, and which is engagable by a pin 36 extending from a releasing slide member 37 (FIGS. 1 and 3) which is manually slidable in the direction along surface 19a in an adjacent recess 38 of one of the surfaces 18 of cabinet 14. It will be apparent that, when spring 31 urges locking member 30 to its projecting position, inclined extension 35 of the locking member moves pin 36 toward the left to the position shown on FIG. 7. However, manual actuation of releasing slide member 37 in the direction of the arrow 39 on FIG. 1, is effective to move pin 36 toward the right, as viewed on FIG. 7, with the result that pin 36 acts on inclined extension 35 of locking member 30 for displacing the latter in the direction of the arrow 40 on FIG. 7 and thereby retracting end portion 30a of locking member 30 for disengagement from keeper 34.

In the illustrated radio receiver 10 according to this invention, the terminal means 22 at surface 17a of tuner cabinet 13 is shown to comprise a plurality of terminal elements 41 (FIG. 8) embedded in mechanical coupling member 20 so as to have exposed terminal ends 41a (FIG. 2) substantially flush with surface 17a of cabinet 13. As shown particularly on FIG. 7, the terminal means 23 includes a plurality of terminal pins 42 slidably mounted in a terminal housing 43 at the inside of cabinet 14 and having end portions 42a adapted to project through corresponding holes 44 in peripheral wall 19 at surface 19a. Helical springs 45 act between terminal housing 43 and flanges 46 on terminal pins 42 for urging the latter to the projecting positions shown on FIG. 7. Of course, the number and positioning of terminal pins 42 of speaker part 12 correspond to the number and positioning, respectively, of the embedded terminal elements 41 of tuner part 11 so that, when parts 11 and 12 are assembled together, as on FIG. 8, end portions 42a of terminal pins 42 are urged under the pressure of the respective springs 45 into engagement with the exposed ends 41a of corresponding embedded terminal elements 41 for establishing the necessary electrical connections between the tuner and speaker parts 11 and 12. In order to ensure that end portions 42a of terminal pins 42 will not interfere with the assembling together of parts 11 and 12, as hereinafter described in detail, the end of mechanical coupling member 20 which is at the open end of cutout 24 in surface 17a is formed with a beveled or oblique end edge 47, as shown particularly on FIGS. 2 and 8.

The manner in which tuner part 11 and speaker part 12 may be assembled together will now be described in detail with reference to FIG. 8. Initially, and as indicated schematically in broken lines at 11', the tuner part may be inclined relative to speaker part 12 so that the end of surface 17a of tuner cabinet 13 at which the open ends 25' of grooves 25a and 25b are disposed will initially engage surface 19a of speaker cabinet 14 at the region of ribs 29a and 29b and preferably at a location between mechanical coupling member 21 and terminal means 23, with the eventually mating surfaces of cabinets 13 and 14 diverging, as indicated at 17'a and 19a. Thus, the ribs 29a and 29b extending from surface 19a are easily engaged in grooves 25a and 25b along surface 17a. Following such engagement, tuner part 11 may be turned in the direction of the arrow 48 on FIG. 8 from the position indicated at 11' to the position indicated in broken lines at 11'' and in which surface 17''a of the tuner part is coplanar with surface 19a of speaker part 12. During the turning of tuner part 11 from the position indicated at 11' to the position indicated at 11'', surface 17a of the tuner cabinet acts against the projecting end portions of terminal pins 42 so as to cause the latter to be depressed or retracted to the surface 19a of speaker cabinet 14. Then, the tuner part 11 can be longitudinally displaced in the direction of the arrow 49 on FIG. 8 from the position shown at 11'' to the final or assembled position shown in full lines. In the course of such longitudinal displacement of tuner part 11 relative to speaker part 12, flanges 27a and 27b are longitudinally inserted in grooves 25a and 25b under the guidance of ribs 29a and 29b. As the movement of tuner part 11 in the direction of arrow 49 continues, the beveled end edge 47 of coupling member 20 acts against the beveled or oblique surface 30b of locking member 30 for depressing the latter against the force of spring 31. Finally, when tuner part 11 attains the position shown in full lines on FIG. 8 relative to speaker part 12, ends 29' of ribs 29a and 29b engage cutout 24a at the closed ends of grooves 25a and 25b to limit further sliding movement of part 11 in the direction of the arrow 49 at a position where the end portion 30a of locking member 30 is engageable under the urging of spring 31 in keeper 34. Accordingly, tuner part 11 is locked in its assembled position relative to speaker part 12 and, in such assembled position, terminal pins 42 are urged by springs 45 into secure engagement with the flush ends 41a of embedded terminal elements 41 for establishing the necessary electrical connections between parts 11 and 12 of the radio receiver.

Although tuner part 11 has been described above as being angled relative to speaker part 12 when initially engaged with the latter in the assembly together of parts 11 and 12, it will be apparent that the assembly operation can be performed with the tuner part being arranged parallel to speaker part 12 when initially engaged with the latter, for example, as indicated at 11'' on FIG. 8. In the latter case, the corner of tuner cabinet 13 at which beveled end edge 47 of coupling member 20 is disposed is initially engaged with surface 19a of speaker cabinet 14 at the end portion of such surface 19a beyond the ends 29' of ribs 29a and 29b. Then, tuner part 11 is longitudinally displaced in the direction of arrow 49 on FIG. 8, so as to cause ends 29' of ribs 29a and 29b to enter the open ends 25' of grooves 25a and 25b. As movement of tuner part 11 continues in the direction of arrow 49 on FIG. 8, beveled end edge 47 of coupling member 20 acts against the projecting end portions 42a of terminal pins 42 to cause the latter to retract and thereby avoid interference with further movement of tuner part 11 in the direction of arrow 49. As such further movement of tuner part 11 progresses, ribs 29a and 29b lead or guide flanges 27a and 27b into grooves 25a and 25b, as in the previous description of the assembling operation, and, finally, tuner part 11 attains its assembled position relative to speaker part 12 and is locked in such position by the engagement of locking member 30 in keeper 34.

When tuner part 11 and speaker part 12 are thus assembled together, leaf spring 28 takes up the play between mechanical coupling members 20 and 21 so as to avoid any rattling of the assembled-together parts. Further, as the assembling together of parts 11 and 12 is effected by the engagement of coupling member 20 of synthetic resin with the aluminum coupling member or rail 21, the assembled parts 11 and 12 are firmly or strongly connected to each other. Moreover, since the coupling member or rail 21 of aluminum and the accompanying leaf spring 28, for example, of steel, extend along approximately one-half of the length of surface 19a of speaker cabinet 14, a suitable bar antenna (not shown) may be arranged in the tuner cabinet 13 at a position which is biased relative to the position of rail 21 and spring 28 when tuner and speaker parts 11 and 12 are assembled together, thereby to permit good reception of radio waves by the bar antenna even when the tuner and speaker parts are assembled together.

It is further to be noted that the recessed or embedded terminal elements 41 and the terminal pins 42 are automatically and securely engaged with each other in the course of assembling together of tuner and speaker parts 11 and 12, that the embedded terminal elements 41 and terminal pins 42 are relied upon only for establishing electrical connections between the assembling parts, and that such embedded terminal elements 41 and terminal pins 42 do not, in any way, interfere with the assembling or disassembling of the parts 11 and 12.

When it is desired to disassemble or detach tuner part 11 from speaker part 12, releasing slide member 37 is manually displaced in the direction of arrow 39 on FIG. 1 so that pin 36 acts against inclined extension 35 of locking member 30 for retracting the latter and thereby disengaging its end portion 30a from keeper 34. Upon such disengagement of locking member 30 from keeper 34, tuner part 11 is free to be displaced longitudinally from the position shown in full lines on FIG. 8 in the direction opposed to arrow 49 so as to slidably disengage flanges 27a and 27b from the respective grooves 25a and 25b. Thereupon, tuner part 11 can be separated from speaker part 12 and can continue to receive radio frequency signals and to produce therefrom audio signals which can be audibly reproduced by an earphone plugged into jack 15.

Figure 9:
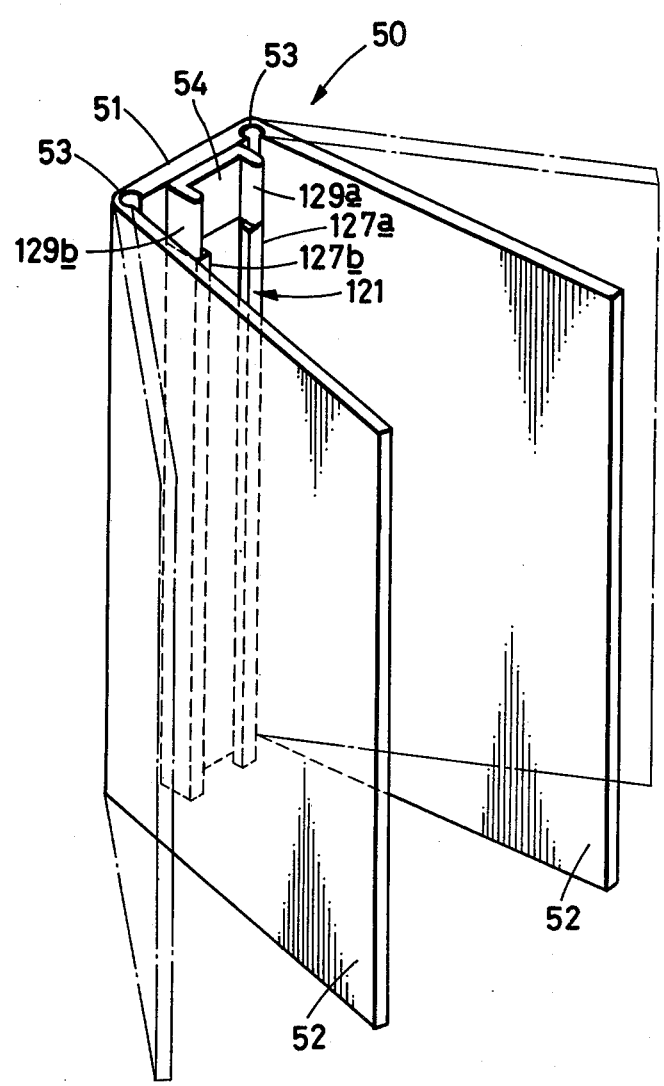
FIG. 9 is a perspective view of a case which is adapted to be applied to the tuner part of the radio receiver of FIG. 1 when the speaker part is disassembled therefrom.

When tuner part 11 has been separated from speaker part 12, a case 50 (FIGS. 9–11) can be mounted on tuner part 11 for protecting the latter. More particularly, case 50 is shown to include a spine member 51 dimensioned to cover surface 17a of tuner cabinet 13, and a pair of cover members 52 which are movably connected with spine member 51, as by hinge portions 53, and which are dimensioned to extend over and cover opposed flat surfaces 16 of the tuner cabinet. In the case where cover members 52 and spine member 51 are integrally formed of a synthetic resin or plastic, hinge portions 53 may be defined merely by suitably thin portions of the plastic material.

Figure 11:
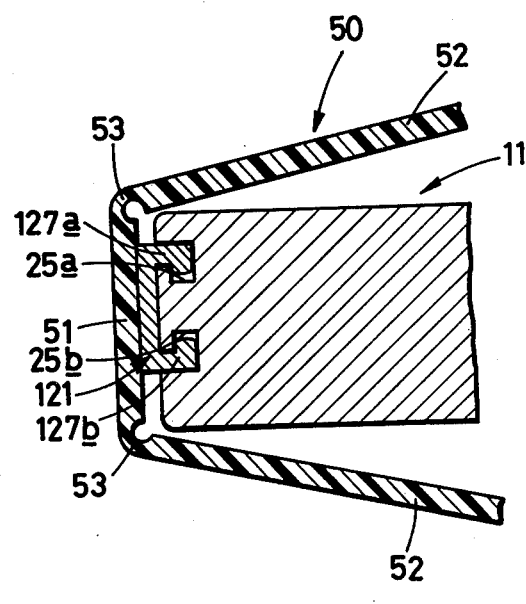
FIG. 11 is a fragmentary sectional view further illustrating the manner in which the case is secured to the tuner part.

In order to mount case 50 on tuner part 11, a mechanical coupling member 121 is suitably secured to the inner surface of spine member 51 and has a cross-sectional configuration similar to that of coupling member 21 of speaker part 12. Thus, coupling member 121 is shown to define flanges 127a and 127b having L-shaped cross sections similar to the cross sections of flanges 27a and 27b, respectively, so as to be slidably insertable in grooves 25a and 25b defined by coupling member 20 at surface 17a of tuner cabinet 13 (FIG. 11). In order to assist in engaging flanges 127a and 127b in grooves 25a and 25b of coupling member 20, case 50 further has a relatively short guide member 54 (FIG. 9) defining ribs 129a and 129b longitudinally aligned with flanges 127a and 127b and corresponding to the ribs 29a and 29b of speaker part 12.

Figure 10:
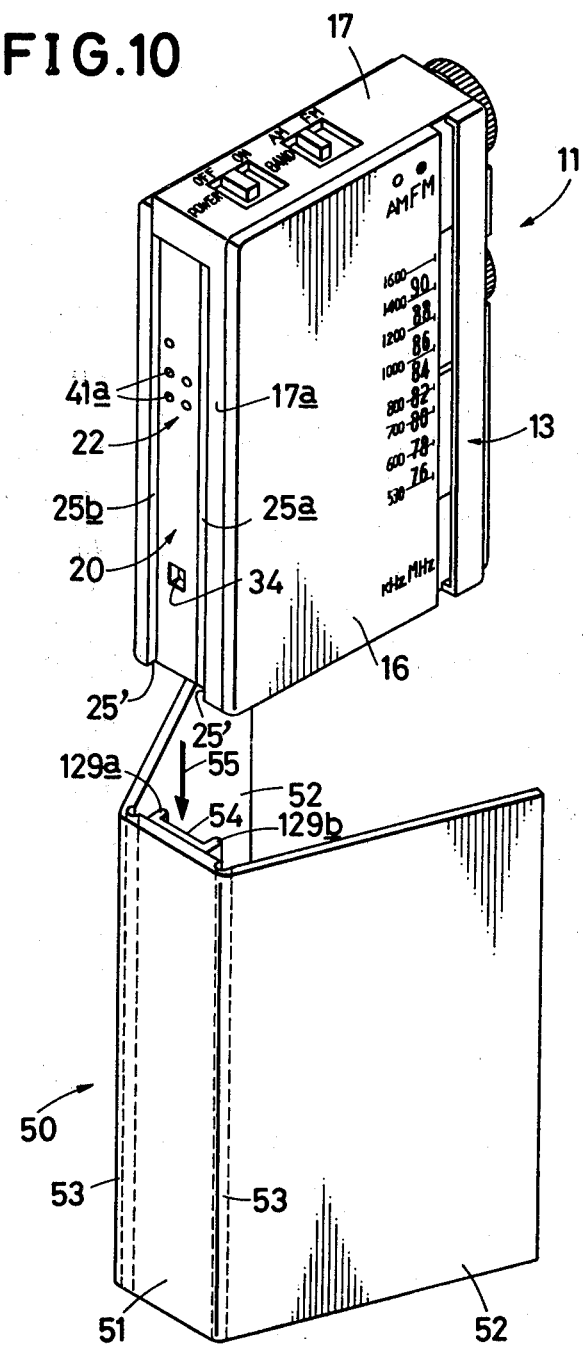
FIG. 10 is an exploded perspective view of the tuner part of FIG. 2 and case of FIG. 9 for illustrating how the same are assembled together.

It will be appreciated that, by reason of the guide member 54 and coupling member 121, case 50 can be assembled with tuner part 11 in the same manner as speaker part 12, that is, guiding ribs 129a and 129b are initially inserted in the open ends 25' of grooves 25a and 25b, and then tuner part 11 is displaced relative to case 50 in the direction of the arrow 55 on FIG. 10 for engaging L-shaped flanges 127a and 127b in the corresponding grooves 25a and 25b. When case 50 is thus mounted on tuner part 11, the various switches and knobs of tuner part 11 are still accessible for manual operation thereof, while the tuner part is substantially protected from damage due to rough or careless handling thereof. In particular, the terminal ends 41a exposed at surface 17a are fully protected by spine member 51 of case 50 so that such terminal ends will not be stained or corroded as a result of handling of the tuner part.

Figure 12:
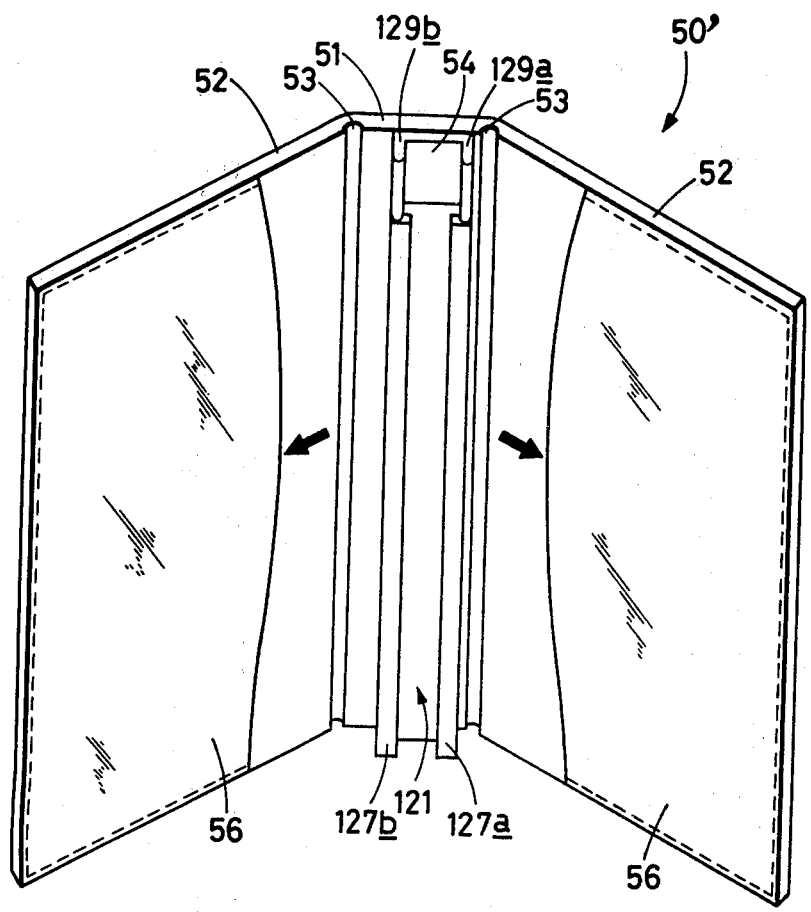
FIG. 12 is a perspective view of a modified case for assembling together with the tuner part of a radio receiver according to this invention.

As is shown on FIG. 12, a case 50' for tuner part 11 which is otherwise the same as the previously described case 50 and has it several parts identified by the same reference numerals, may be further provided with pockets or pouches 56 formed of films of transparent plastic or synthetic resin secured to the inner surfaces of cover members 52, as shown, or alternatively to the outer surfaces of such cover members. The pouches or pockets 56 may receive photographs or business cards so as to provide a utility of case 50' beyond the mere protection of tune part 11.

Although illustrative embodiments of the invention have been specifically described herein with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A portable radio receiver comprising: a first part having a radio tuner and an earphone jack and being operative for receiving a radio frequency signal and providing an electrical audio frequency signal at said jack;

a second part having a speaker unit;

said first and second parts having respective first and second cabinets with mating surfaces, respectively, at which said cabinets can be brought together in abutting relationship;

assembling means for detachably assembling together said first and second parts with said mating surfaces of the respective cabinets in said abutting relationship, said assembling means including complementary mechanical coupling members at said mating surfaces of the first and second cabinets, respectively, and electrical coupling means separate from said mechanical coupling members at said mating surfaces; for applying said audio frequency signal from said first part to said speaker unit when said first and second parts are used together;

one of said mechanical coupling members defining at least one undercut groove extending a substantial distance along the respective one of said mating surfaces and having an opening at one end of the groove, the other of said mechanical coupling members defining, for each said undercut groove, a flange extending a substantial distance along the other mating surface and having a cross-sectional shape corresponding to that of the respective undercut groove so as to be slidably insertable in the latter through said end opening upon relative displacements of said first and second cabinets in directions parallel with each said groove and flange; said electrical coupling means including cooperative terminal means at said mating surfaces, respectively, and being engaged with each other for establishing electrical connections between said first and second parts when the latter are assembled together with said mating surfaces in said abutting relationship; and detachable protective case means adapted to at least partly envelop said first part when the latter is detached from said second part said case means including a mechanical coupling member which is complementary to, and engageable with said mechanical coupling member at the mating surface of said cabinet of the first part, and by which said case means can be detachably assembled with said first part.

2. A portable radio receiver according to claim 1; in which said one mechanical coupling member defines another said groove parallel to said one groove and being undercut in the opposite direction to the latter, and said flange insertable in said one groove and the flange insertable in said other groove have edge portions directed toward each other; and in which said assembly means further includes an arcuate leaf spring retained by said flanges of the other mechanical coupling member and resiliently engaging between said mechanical coupling members for taking-up any play therebetween when said flanges engage in said grooves.

3. A portable radio receiver according to claim 1; in which said first cabinet is substantially in the form of a rectangular parallelepiped having two opposed flat surfaces between which the respective one of said mating surfaces extends, and said case means covers at least said two opposed flat surfaces when assembled with said first part.

4. A portable radio receiver according to claim 3; in which said case means includes a spine member from which said coupling member of the case means extends, and cover members hingedly joined to said spine member for covering said opposed flat surfaces of said first cabinet.

5. A portable radio receiver according to claim 4; in which said cover members have pockets for receiving card-like articles.

6. A portable radio receiver according to claim 1; in which said assembly means further includes a leaf spring retained by one of said mechanical coupling members and engageable resiliently between the latter for taking-up any play therebetween when each said flange engages in the respective groove.

7. A portable radio receiver according to claim 1; in which said earphone jack is engageable by an earphone by which said audio signals supplied to the earphone jack are convertible into sound when said first part is detached from said second part.

8. A portable radio receiver according to claim 1; in which said one mechanical coupling member defining each said groove is of a plastic material, and said other mechanical coupling member defining each said flange is constituted by a metal rail-like member.

9. A portable radio receiver according to claim 8; in which each said groove extends along substantially the entire length of said respective one of the mating surfaces, and said rail-like member extends along approximately one half of the length of said other mating surface; and in which said other mating surface has an integral rib extending therefrom in longitudinal alignment with each said flange along the other half of the length of said other mating surface and being engageable in the respective groove for leading the aligned flange into the latter.

10. A portable radio receiver according to claim 1; in which said assembly means further includes locking means for preventing relative displacements of said first and second cabinets in said directions parallel with each said groove and flange following assembling together of said first and second parts with said mating surfaces in said abutting relationship.

11. An portable radio receiver according to claim 10; in which said locking means includes a locking member mounted in one of said parts for movement normal to the mating surface of the respective cabinet and being urged to a projecting position beyond said mating surface of the cabinet of said one part, a keeper in said mating surface of the cabinet of the other of said parts to receive said locking member in said projecting position of the latter, and releasing means actuable for retracting said locking member from said keeper.

12. A portable radio receiver according to claim 1; in which said cooperative terminal means include a plurality of terminals embedded in one of said cabinets so as to have exposed terminal ends substantially flush with said mating surface of said one cabinet, a corresponding plurality of terminal pins carried by the other of said cabinets so as to be movable normal to the mating surface of said other cabinet, and springs acting on said terminal pins to urge the latter to project beyond the mating surface of said other cabinet and into contact with said terminal ends of the respective embedded terminals when said first and second parts are assembled together with said mating surfaces in said abutting relationship.

13. A portable radio receiver according to claim 12; in which said mating surface of said one cabinet has a beveled end surface portion to depress said terminal pins and thereby avoid interference by the latter with said relative displacements of the cabinets for achieving the abutting relationship.

* * * * *